(12) United States Patent
Onuki et al.

(10) Patent No.: US 11,376,568 B2
(45) Date of Patent: Jul. 5, 2022

(54) EXHAUST GAS-PURIFYING THREE-WAY CATALYST

(71) Applicant: N.E. CHEMCAT Corporation, Minato-ku (JP)

(72) Inventors: Toshinori Onuki, Minato-ku (JP); Yoshinori Takahashi, Minato-ku (JP)

(73) Assignee: N.E. CHEMCAT Corporation, Minato-ku (JP)

( * ) Notice: Subject to any disclaimer, the term of this patent is extended or adjusted under 35 U.S.C. 154(b) by 68 days.

(21) Appl. No.: 16/962,675

(22) PCT Filed: Jan. 28, 2019

(86) PCT No.: PCT/JP2019/002773
§ 371 (c)(1),
(2) Date: Jul. 16, 2020

(87) PCT Pub. No.: WO2019/163435
PCT Pub. Date: Aug. 29, 2019

(65) Prior Publication Data
US 2020/0360901 A1 Nov. 19, 2020

(30) Foreign Application Priority Data
Feb. 22, 2018 (JP) .............................. JP2018-029838

(51) Int. Cl.
*B01J 21/04* (2006.01)
*B01J 21/06* (2006.01)
*B01J 23/02* (2006.01)
*B01J 23/10* (2006.01)
(Continued)

(52) U.S. Cl.
CPC ............... *B01J 23/63* (2013.01); *B01J 21/04* (2013.01); *B01J 21/066* (2013.01); *B01J 23/10* (2013.01);
(Continued)

(58) Field of Classification Search
CPC . B01J 21/04; B01J 21/066; B01J 23/02; B01J 23/10; B01J 23/44; B01J 23/464;
(Continued)

(56) References Cited

U.S. PATENT DOCUMENTS 5,597,771 A * 1/1997 Hu ........................ F01N 3/106
502/304
6,294,140 B1 * 9/2001 Mussmann ............... B01J 35/04
423/213.5
(Continued)

FOREIGN PATENT DOCUMENTS

| JP | 2007-278100 A | 10/2007 |
|---|---|---|
| JP | 2010-501337 A | 1/2010 |
| JP | 2010-38004 A | 2/2010 |

OTHER PUBLICATIONS

International Search Report dated Apr. 16, 2019 in PCT/JP2019/002773 filed on Jan. 28, 2019, 2 pages.

*Primary Examiner* — Cam N. Nguyen
(74) *Attorney, Agent, or Firm* — Oblon, McClelland, Maier & Neustadt, L.L.P.

(57) ABSTRACT

Provided is, for example, an exhaust gas-purifying three-way catalyst which is small in the amount of a platinum group element used, which can be early increased in temperature to a catalytically active temperature, which is suppressed in degradation in performance due to a catalyst poison included in an exhaust gas even if placed directly under an engine, and which is excellent in purification performance. An exhaust gas-purifying three-way catalyst including at least a catalyst carrier 11 and a catalyst layer 21, wherein the catalyst layer 21 has a layered structure having at least a first catalyst layer L1, a second catalyst layer L2 and a third catalyst layer L3 in the listed order, the first catalyst layer L1 contains a first composite catalyst particle including palladium supported on a first base material par-
(Continued)

ticle, the second catalyst layer L2 contains a second composite catalyst particle including rhodium supported on a second base material particle, the third catalyst layer L3 contains a third composite catalyst particle including palladium supported on a third base material particle, and the total coating weight Wt in the catalyst layers L1, L2, and L3 (provided that the platinum group element included in each of the catalyst layers is excluded) is 110 g/L or more and 225 g/L or less in total, per volume of the catalyst carrier 11.

10 Claims, 3 Drawing Sheets

(51) Int. Cl.
  *B01J 23/44* (2006.01)
  *B01J 23/46* (2006.01)
  *B01J 23/58* (2006.01)
  *B01J 23/63* (2006.01)
  *B01J 35/00* (2006.01)
  *F01N 3/10* (2006.01)
  *F01N 3/28* (2006.01)

(52) U.S. Cl.
  CPC .......... *B01J 35/0053* (2013.01); *F01N 3/101* (2013.01); *F01N 3/2825* (2013.01); *F01N 2510/06* (2013.01)

(58) Field of Classification Search
  CPC ........ B01J 23/58; B01J 23/63; B01J 35/0053; F01N 3/101; F01N 3/2825
  See application file for complete search history.

(56) References Cited

U.S. PATENT DOCUMENTS

| | | | | |
|---|---|---|---|---|
| 6,764,665 | B2 * | 7/2004 | Deeba | B01D 53/945 423/239.1 |
| 7,517,510 | B2 * | 4/2009 | Chen | B01D 53/945 423/213.2 |
| 7,550,124 | B2 * | 6/2009 | Chen | B01J 37/0244 423/213.2 |
| 7,758,834 | B2 * | 7/2010 | Chen | B01J 37/0248 423/213.2 |
| 7,879,755 | B2 * | 2/2011 | Wassermann | B01D 53/945 502/304 |
| 7,922,988 | B2 * | 4/2011 | Deeba | B01D 53/9472 423/213.2 |
| 8,038,951 | B2 * | 10/2011 | Wassermann | B01J 35/04 422/168 |
| 8,039,418 | B2 * | 10/2011 | Kitamura | B01J 23/63 502/325 |
| 8,323,599 | B2 * | 12/2012 | Nunan | B01D 53/9477 423/213.2 |
| 8,394,348 | B1 * | 3/2013 | Nunan | B01J 35/0006 423/213.2 |
| 8,551,908 | B2 * | 10/2013 | Satou | B01D 53/945 502/327 |
| 8,557,204 | B2 * | 10/2013 | Nunan | B01J 35/04 423/213.5 |
| 8,968,690 | B2 * | 3/2015 | Nunan | B01D 53/94 423/213.5 |
| 9,440,223 | B2 * | 9/2016 | Aoki | B01D 53/945 |
| 10,428,708 | B2 * | 10/2019 | Utschig | B01J 23/58 |
| 10,576,420 | B2 * | 3/2020 | Chinzei | C01F 17/224 |
| 2007/0283686 | A1 | 12/2007 | Ohkubo et al. | |
| 2008/0044330 | A1 | 2/2008 | Chen et al. | |
| 2008/0219906 | A1 * | 9/2008 | Chen | B01J 23/63 423/213.5 |
| 2010/0087314 | A1 * | 4/2010 | Kitamura | B01D 53/925 502/304 |
| 2010/0212293 | A1 * | 8/2010 | Deeba | F01N 3/103 60/274 |
| 2011/0126528 | A1 | 6/2011 | Yamada et al. | |
| 2013/0058848 | A1 * | 3/2013 | Nunan | B01J 23/42 423/213.5 |
| 2017/0197179 | A1 * | 7/2017 | Yoshikawa | B01J 37/0244 |
| 2018/0021758 | A1 * | 1/2018 | Kumatani | B01J 35/02 502/154 |

* cited by examiner

EXHAUST GAS-PURIFYING THREE-WAY CATALYST

TECHNICAL FIELD

The present invention relates to an exhaust gas-purifying three-way catalyst including a catalyst layer of a layered structure, in which palladium and rhodium are used as catalytically active components.

BACKGROUND ART

Three-way catalysts (TWC) with platinum group elements (PGM: Platinum Group Metals) such as ruthenium, rhodium, palladium, osmium, iridium, and platinum as catalytically active components are widely used in purification of hydrocarbon (HC), carbon monoxide (CO), and nitrogen oxide (NOx) emitted from internal-combustion engines of automobiles and the like.

There has been conventionally widely used an exhaust gas-purifying catalyst having a composite particle structure where a catalytically active component in the form of a fine particle is supported on a carrier, in order to not only reduce the amount of a relatively expensive PGM used, but also ensure a high catalytic activity. Specific examples include an exhaust gas-purifying catalyst including a carrier (base material particle) made of a metal oxide such as alumina, zirconia, or ceria, and a catalyst particle of a platinum group element supported on the carrier.

Such an exhaust gas-purifying catalyst is often provided directly under an engine in order that an exhaust gas at a high temperature is fed for a reduction in warming time to thereby early increase the temperature to a catalytically active temperature to allow highly efficient purification performance to be exhibited. Such a configuration structure, however, has the disadvantage of easy degradation in catalyst performance due to heat of the exhaust gas, and is required to be increased in the amount of the platinum group element used in order to complement such degradation in performance, resulting in a higher cost.

Various suggestions have been conventionally made in order to avoid such problems. For example, Patent Literature 1 discloses an exhaust gas purification apparatus where not only an engine head block and a first catalytic converter are connected by use of an exhaust pipe as a single pipe instead of a conventional exhaust manifold to result in a reduction in the length of the exhaust pipe to the first catalytic converter, but also first and second catalytic converters each made of a catalyst excellent in heat resistance are separately provided away from each other. Patent Literature 2 discloses an exhaust gas purification apparatus where not only a catalytic converter including upstream and downstream catalysts each made of a catalyst excellent in heat resistance are provided immediately downstream of an exhaust manifold, but also a commutation path having a predetermined length and sequentially narrowing in width from the upstream toward the downstream is provided on an exhaust manifold-aggregated section to thereby properly adjust the commutation and the temperature of an exhaust gas.

CITATION LIST

Patent Literature

Patent Literature 1: Japanese Patent Laid-Open No. 2007-278100
Patent Literature 2: Japanese Patent Laid-Open No. 2010-038004

SUMMARY OF INVENTION

Technical Problem

It is considered that the exhaust gas purification apparatus described in each of Patent Literatures 1 and 2 can achieve both suppression of degradation in catalyst performance due to an exhaust gas at a high temperature and a reduction in the amount of a platinum group element used. It, however, has been found according to findings of the present inventors that the exhaust gas purification apparatus described in each of Patent Literatures 1 and 2 is placed directly under an engine to thereby cause the occurrence of poisoning due to a catalyst poison such as a phosphorus compound flowing in together with an exhaust gas at a high temperature, resulting in degradation in catalyst performance.

The present invention has been made in view of the above problems. That is, an object of the present invention is to provide, for example, an exhaust gas-purifying three-way catalyst which is small in the amount of a platinum group element used, which can be early increased in temperature to a catalytically active temperature, which is suppressed in degradation in performance due to a catalyst poison included in an exhaust gas even if placed directly under an engine, and which is excellent in purification performance.

Solution to Problem

The present inventors have made intensive studies in order to solve the above problems, and as a result, have found that the above problems can be solved by providing a catalyst layer of a predetermined layer configuration in a predetermined coating weight, on a catalyst carrier, thereby leading to completion of the present invention.

That is, the present invention provides various specific aspects described below.

(1) An exhaust gas-purifying three-way catalyst comprising at least a catalyst carrier and a catalyst layer provided on at least one surface of the catalyst carrier, wherein the catalyst layer has a layered structure comprising at least a first catalyst layer comprising a platinum group element, a second catalyst layer comprising a platinum group element, and a third catalyst layer as an outermost layer, comprising a platinum group element, in the listed order, the first catalyst layer comprises at least a first base material particle and a first composite catalyst particle comprising palladium at least supported on the first base material particle, the second catalyst layer comprises at least a second base material particle and a second composite catalyst particle comprising rhodium at least supported on the second base material particle, the third catalyst layer comprises at least a third base material particle and a third composite catalyst particle comprising palladium at least supported on the third base material particle, and a total coating weight Wt in the first to third catalyst layers (provided that the platinum group element comprised in each of the catalyst layers is excluded) per volume of the catalyst carrier is 110 g/L or more and 225 g/L or less in total.

(2) The exhaust gas-purifying three-way catalyst according to (1), wherein a coating weight $W_1$ in the first catalyst layer (provided that the platinum group element comprised in the first catalyst layer is excluded) relative to the total coating weight Wt in the first to third catalyst layers (provided that the platinum group element comprised in each of the catalyst layers is excluded) satisfies the following relationship;

$$0.1 \text{ Wt} \leq W_1 \leq 0.4 \text{ Wt.}$$

(3) The exhaust gas-purifying three-way catalyst according to (1) or (2), wherein the total coating weight Wt in the first to third catalyst layers (provided that the platinum group element comprised in each of the catalyst layers is excluded) is 125 g/L or more and 200 g/L or less in total, per volume of the catalyst carrier.
(4) The exhaust gas-purifying three-way catalyst according to any one of (1) to (3), wherein the catalyst layer comprises 1 g/L or more and 10 g/L or less in total of the platinum group elements, per volume of the catalyst carrier.
(5) The exhaust gas-purifying three-way catalyst according to any one of (1) to (4), wherein the first to third base material particles each comprises an oxygen storage material comprising a ceria/zirconia-based composite oxide doped with at least one rare-earth element selected from the group consisting of scandium, yttrium, lanthanum, praseodymium, neodymium, promethium, samarium, europium, gadolinium, terbium, dysprosium, holmium, erbium, thulium, ytterbium, and lutetium.
(6) The exhaust gas-purifying three-way catalyst according to (5), wherein the ceria/zirconia-based composite oxide comprises, as constituent metal elements, Nd and Pr at the following mass proportions in terms of oxide;

| | |
|---|---|
| $CeO_2$ | 10 to 50% by mass |
| $ZrO_2$ | 40 to 80% by mass |
| $Nd_2O_3$ | 0.1 to 10% by mass |
| $Pr_5O_{11}$ | 0.1 to 10% by mass |

(7) The exhaust gas-purifying three-way catalyst according to (6), wherein a Ce content proportion of the ceria/zirconia-based composite oxide of the first base material particle is higher than a Ce content proportion of the ceria/zirconia-based composite oxide of the third base material particle, in terms of $CeO_2$.
(8) The exhaust gas-purifying three-way catalyst according to any one of (1) to (7), wherein the first and third catalyst layers each further comprise a composite catalyst particle comprising alumina having a specific surface area of 50 to 300 m²/g and palladium at least supported on the alumina.
(9) The exhaust gas-purifying three-way catalyst according to any one of (1) to (8), wherein the second catalyst layer further comprises alumina having a specific surface area of 50 to 300 m²/g.
(10) The exhaust gas-purifying three-way catalyst according to any one of (1) to (9), wherein the first and third catalyst layers each further comprises a Ba-containing compound.
(11) The exhaust gas-purifying three-way catalyst according to any one of (1) to (10), wherein a mass ratio between the respective platinum group elements comprised in the first and third catalyst layers is in the range of first catalyst layer:third catalyst layer=1:1 to 4.
(12) The exhaust gas-purifying three-way catalyst according to any one of (1) to (11), wherein a mass ratio between palladium and rhodium comprised in the first to third catalyst layers is in the range of Pd:Rh=4 to 20:1 in total.

Advantageous Effects of Invention

The present invention can realize, for example, an exhaust gas-purifying three-way catalyst which is small in the amount of a platinum group element used, which can be early increased in temperature to a catalytically active temperature, which is excellent in resistance to a catalyst poison included in an exhaust gas, and which is excellent in purification performance. The exhaust gas-purifying catalyst of the present invention can be particularly suitably used as a three-way catalyst (TWC) which contains a catalyst particle of a composite structure where a large number of fine active points (each corresponding to a catalytically active particle of a platinum group element) are supported on a base material particle, and which decreases NOx, CO, HC, and the like in an exhaust gas, based on the composition and structure thereof. The exhaust gas-purifying three-way catalyst or the like of the present invention can be mounted in a directly-under-engine type catalytic converter, a tandem-arranged directly-under type catalytic converter, and the like, and thus can be achieved in terms of a decrease in canning cost, for example.

DESCRIPTION OF EMBODIMENTS

Hereinafter, embodiments of the present invention will be described in detail with reference to the drawings. Herein, the positional relation of the left, right, top and bottom is based on the positional relation illustrated in the drawings, unless otherwise noted. Herein, the dimension scale in the drawings is also not limited to the scale illustrated in the drawings. It is noted that the following embodiments are illustrative for describing the present invention and the present invention is not limited thereto. That is, the present invention can be arbitrarily modified and carried out without departing from the gist thereof. Herein, for example, the designation "1 to 100" as the numerical range includes both the upper limit "100" and the lower limit "1". The same is true on the designation of other numerical range.

Figure 1:
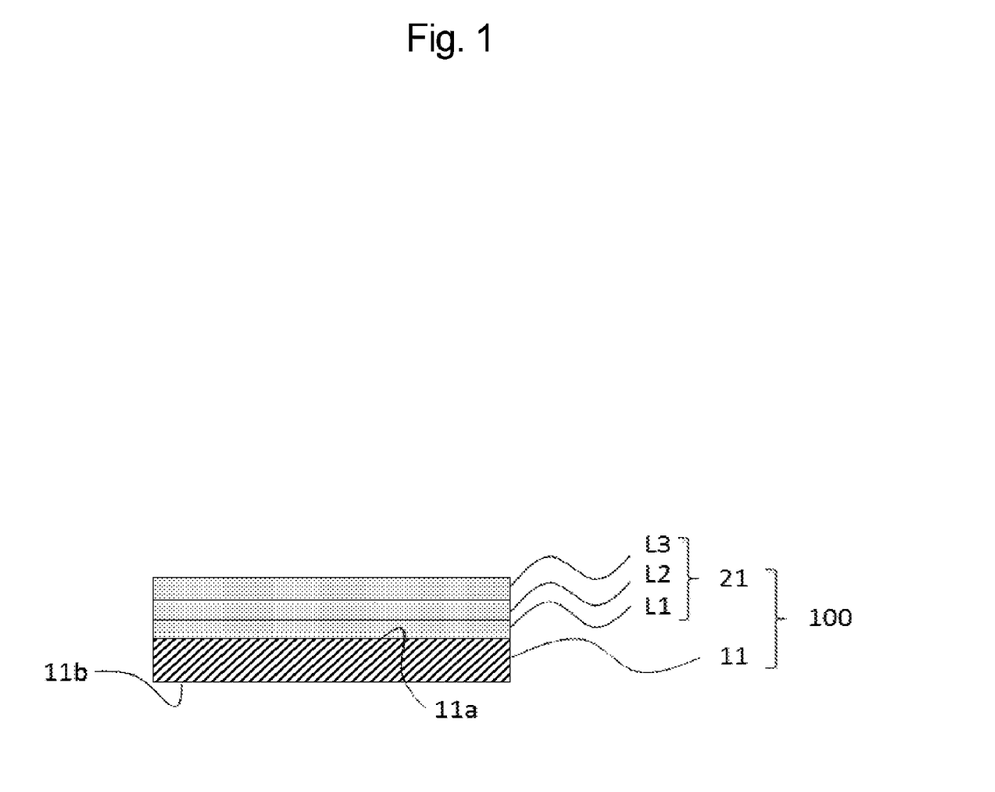
FIG. 1 is a schematic view illustrating a schematic configuration of an exhaust gas-purifying three-way catalyst 100 of one embodiment.

FIG. 1 is a schematic view illustrating a schematic configuration of an exhaust gas-purifying three-way catalyst 100 of one embodiment of the present invention. The exhaust gas-purifying three-way catalyst 100 includes a catalyst carrier 11, and a catalyst layer 21 provided on at least one surface of the catalyst carrier 11. In the present embodiment, the catalyst layer 21 has a layered structure including at least a first catalyst layer L1 including a platinum group element, a second catalyst layer L2 including a platinum group element, and a third catalyst layer L3 as an outermost layer, including a platinum group element, in the listed order. Hereinafter, each constituent component will be described in detail.

The catalyst carrier 11 is a catalyst member for carrying the catalyst layer 21. An integral structure type exhaust gas-purifying three-way catalyst (exhaust gas-purifying three-way catalyst 100) where the catalyst layer 21 is provided on the catalyst carrier 11 is used to thereby allow applicability to various applications to be increased, for example, allow incorporation into an apparatus to be facilitated. For example, in the case of an exhaust gas purification application, exhaust gas purification can be performed at a high efficiency by using a honeycomb structure carrier or the like as the catalyst carrier 11, placing an integral structure type layered catalyst member in a flow passage through which a gas stream passes, and allowing the gas stream to pass into a cell of the honeycomb structure carrier.

The catalyst carrier 11 here used can be appropriately selected from those known in the art. Representative examples include ceramic monolith carriers of cordierite, silicon carbide, and silicon nitride, metal honeycomb carriers made of stainless steel, wire mesh carriers made of stainless steel, and steel wool-like knitted wire carriers, but are not particularly limited thereto. The shape is not particularly limited, and can be selected from any shapes such as a prism shape, a cylindrical shape, a spherical shape, a honeycomb shape, and a sheet shape. Such shapes can be used singly or in appropriate combinations of two or more thereof.

Herein, the "provided on at least one surface of the catalyst carrier 11" means to encompass both an aspect where the catalyst layer 21 is provided on only one surface 11a (or the other surface 11b) of the catalyst carrier 11, as illustrated in FIG. 1, and an aspect where the catalyst layer 21 is provided on both surfaces 11a and 11b of the catalyst carrier 11. Any other layer(s) (for example, a primer layer and/or an adhesion layer) may be interposed between the catalyst carrier 11 and the catalyst layer 21, and the "provided on at least one surface", as used herein, means to encompass both an aspect where the catalyst carrier 11 and the catalyst layer 21 are directly placed and an aspect where the catalyst carrier 11 and the catalyst layer 21 are disposed away with such any other layer(s) being interposed therebetween.

The catalyst layer 21 has a layered structure including at least the first catalyst layer L1, the second catalyst layer L2, and the third catalyst layer L3 as an outermost layer, in the listed order. Herein, the "including at least . . . in the listed order" means that the first catalyst layer L1, the second catalyst layer L2, and the third catalyst layer L3 are disposed in the listed order, and any other layer(s) (for example, a primer layer and/or an adhesion layer) may be interposed among such layers as long as these catalyst layers are arranged in the listed order. That is, the layered structure of the catalyst layer 21 may correspond to any of an aspect where the first catalyst layer L1, the second catalyst layer L2, and the third catalyst layer L3 are directly placed (first catalyst layer L1/second catalyst layer L2/third catalyst layer L3) and an aspect where the first catalyst layer L1, the second catalyst layer L2, and the third catalyst layer L3 are disposed away with such any other layer(s) being interposed therebetween (for example, first catalyst layer L1/other layer/second catalyst layer L2/other layer/third catalyst layer L3, first catalyst layer L1/other layer/second catalyst layer L2/third catalyst layer L3, first catalyst layer L1/second catalyst layer L2/other layer/third catalyst layer L3).

The first catalyst layer L1 here contains at least a first composite catalyst particle including a first base material particle and palladium as a catalytically active particle at least supported on the first base material particle. The platinum group element contained in the first catalyst layer L1 corresponds to palladium as an essential element. The first base material particle is a carrier particle where the catalytically active particle is supported in a highly dispersed manner.

The second catalyst layer L2 contains at least a second composite catalyst particle including a second base material particle and rhodium as a catalytically active particle at least supported on the second base material particle. The platinum group element contained in the second catalyst layer L2 corresponds to rhodium as an essential element. The second base material particle is a carrier particle where the catalytically active particle is supported in a highly dispersed manner.

The third catalyst layer L3 then contains at least a third composite catalyst particle including a third base material particle and palladium as a catalytically active particle at least supported on the third base material particle. The platinum group element contained in the third catalyst layer L3 corresponds to palladium as an essential element. The third base material particle is a carrier particle where the catalytically active particle is supported in a highly dispersed manner.

The first to third base material particles each supporting the platinum group element and a noble metal element can be appropriately selected from those known in the art, depending on the required performance, and the types thereof are not particularly limited. Examples include metal oxides or metal composite oxides such as cerium oxide, zirconium oxide, lanthanum oxide, neodymium oxide, and praseodymium oxide, or stabilized composite oxides thereof each doped with a rare-earth element or a transition element; and perovskite-type oxides, but are not particularly limited thereto. Such materials can be used singly or in appropriate combinations of two or more thereof. In particular, an oxygen storage material having oxygen storage capacity is preferably used in each of the first to third base material particles. Examples of the oxygen storage material include a ceria-based oxygen storage material (for example, ceria-based (composite) oxide) and a zirconia-based highly heat-resistant material (for example, zirconia-based (composite) oxide), but are not particularly limited thereto.

Herein, the "ceria-based (composite) oxide" is used as a term encompassing both a ceria-based oxide and a ceria-based composite oxide, and is specifically used for a concept encompassing ceria ($CeO_2$), or a composite oxide or a solid solution thereof doped with any other element. The "zirconia-based (composite) oxide" is again used as a term encompassing both a zirconia-based oxide and a zirconia-based composite oxide, and is specifically used for a concept encompassing zirconia ($ZrO_2$), or a composite oxide or a solid solution thereof doped with any element other than cerium. It is noted that a cerium-zirconium-based composite oxide containing both cerium and zirconium is regarded as corresponding to the former ceria-based composite oxide and not corresponding to the latter zirconia-based composite oxide.

Specific examples of the ceria-based (composite) oxide include cerium (IV) oxide, a rare-earth element composite oxide excluding cerium-cerium, a cerium-transition element composite oxide, and a rare-earth element-transition element composite oxide excluding cerium-cerium. In particular, the ceria-based oxygen storage material is preferably a ceria-zirconia-based composite oxide excellent in balance between oxygen storage capacity and heat resistance, more preferably a ceria-zirconia-based composite oxide forming a solid solution with any rare-earth element other than cerium and zirconium. The ceria-based (composite) oxide preferably used herein is any oxide where the total mass rate of Ce and Zr is 50% by mass or more and 95% by mass or less in terms of oxides ($CeO_2$ and $ZrO_2$).

Specific examples of the zirconia-based (composite) oxide include zirconium oxide (IV), a rare-earth element composite oxide excluding zirconium-cerium and zirconium, a zirconium-transition element composite oxide, and a rare-earth element-transition element composite oxide excluding zirconium-cerium and zirconium. In particular, the zirconia-based highly heat-resistant material is more preferably a zirconia-based composite oxide forming a solid solution with any rare-earth element other than cerium and zirconium, for example, from the viewpoint of the balance among heat resistance, toughness, and the like. The zirconia-based (composite) oxide preferably used herein is any oxide where the mass rate of Zr is 50% by mass or more and 80% by mass or less in terms of oxide ($ZrO_2$).

The ceria-based (composite) oxide and the zirconia-based (composite) oxide may each include any rare-earth element (hereinafter, sometimes referred to as "other rare-earth element".) other than cerium and zirconium, such as scandium, yttrium, lanthanum, praseodymium, neodymium, promethium, samarium, europium, gadolinium, terbium, dysprosium, holmium, erbium, thulium, ytterbium, and lutetium. In particular, yttrium, lanthanum, praseodymium, and neodymium are preferable. Such any other rare-earth elements can be used singly or in appropriate combinations of two or more thereof. When such any other rare-earth element is included, the content proportion thereof is not particularly limited and is preferably 0.1% by mass or more, more preferably 3% by mass or more, further preferably 5% by mass or more, and preferably 55% by mass or less, more preferably 50% by mass or less, further preferably 45% by mass or less, as the total amount in terms of oxide of such any other rare-earth element (for example, the total of $La_2O_3$, $Nd_2O_3$, and $Pr_5O_{11}$), based on the total amount of the base material particle.

The ceria-based (composite) oxide and the zirconia-based (composite) oxide may each include a transition element such as chromium, cobalt, iron, nickel, titanium, manganese, and copper. Such transition elements can be used singly or in appropriate combinations of two or more thereof. When the transition element is included, the content proportion thereof is not particularly limited and is preferably 0.01% by mass or more, more preferably 0.1% by mass or more, further preferably 0.5% by mass or more, and preferably 10% by mass or less, more preferably 5% by mass or less, further preferably 3% by mass or less, as the total amount in terms of oxide of the transition element (for example, the total of $Fe_2O_3$ and $TiO_2$), based on the total amount of the base material particle.

Herein, cerium and zirconium in the ceria-based (composite) oxide and the zirconia-based (composite) oxide may each be partially substituted with an alkali metal element such as lithium, sodium, or potassium, or an alkali earth metal element such as beryllium, magnesium, calcium, strontium, or barium. Such alkali metal elements and alkali earth metal elements can be used singly, or in any combinations or at any ratio of two or more thereof. The ceria-based (composite) oxide and the zirconia-based (composite) oxide may each contain hafnium (Hf), as an inevitable impurity, usually included at a rate of about 1 to 2% by mass in zirconia ore.

In particular, the first to third base material particles are each preferably a ceria/zirconia-based composite oxide doped with any other rare-earth element described above, from the viewpoint that, for example, the oxygen storage capacity is kept high. Such other rare-earth element is here preferably yttrium, lanthanum, praseodymium, or neodymium, more preferably praseodymium or neodymium. The first to third base material particles are each particularly preferably a ceria/zirconia-based composite oxide doped with such other rare-earth element, containing, as constituent metal elements, Nd and Pr at the following mass proportions in terms of oxide.

| | |
|---|---|
| $CeO_2$ | 10 to 50% by mass |
| $ZrO_2$ | 40 to 80% by mass |
| $Nd_2O_3$ | 0.1 to 10% by mass |
| $Pr_5O_{11}$ | 0.1 to 10% by mass |

When the ceria/zirconia-based composite oxide doped with any other rare-earth element described above is used in each of the first to third base material particles, the Ce content proportion of the first base material particle is preferably higher than the Ce content proportion of the third base material particle in terms of $CeO_2$ from the viewpoint that, for example, the oxygen storage capacity of the entire catalyst layer 21 is kept high even if the outermost layer is poisoned by catalyst poison. Specifically, the first base material particle is particularly preferably a ceria/zirconia-based composite oxide doped with any other rare-earth element, containing, as constituent metal elements, Nd and Pr at the following mass proportions in terms of oxide.

| | |
|---|---|
| $CeO_2$ | 35 to 50% by mass |
| $ZrO_2$ | 40 to 60% by mass |
| $Nd_2O_3$ | 0.1 to 10% by mass |
| $Pr_5O_{11}$ | 0.1 to 10% by mass |

The third base material particle is particularly preferably a ceria/zirconia-based composite oxide doped with any other rare-earth element, containing, as constituent metal elements, Nd and Pr at the following mass proportions in terms of oxide.

| | |
|---|---|
| $CeO_2$ | 10 to 34% by mass |
| $ZrO_2$ | 40 to 80% by mass |
| $Nd_2O_3$ | 0.1 to 10% by mass |
| $Pr_5O_{11}$ | 0.1 to 10% by mass |

The average particle sizes ($D_{50}$) of the first to third base material particles can each be appropriately set depending on the desired performance and are not particularly limited, and are each preferably 0.5 μm or more, more preferably 1 μm or more, further preferably 3 μm or more, and preferably 30 μm or less, more preferably 15 μm or less, further preferably 10 μm or less, from the viewpoint that, for example, not only a large specific surface area is retained, but also heat resistance is enhanced, resulting in an increase in the number of catalytically active sites in such each particle by itself. The average particle sizes $D_{50}$ of the first to third base material particles each mean the median size measured with a laser diffraction type particle size distribution measuring apparatus (for example, laser diffraction type particle size distribution measuring apparatus SALD-3100 manufactured by Shimadzu Corporation).

The BET specific surface areas of the first to third base material particles can each be appropriately set depending on the desired performance and are not particularly limited, and are each preferably 2 $m^2/g$ or more, more preferably 3 $m^2/g$ or more, further preferably 4 $m^2/g$ or more, and preferably 30 $m^2/g$ or less, more preferably 28 $m^2/g$ or less, further preferably 26 $m^2/g$ or less, as the BET specific surface area according to a BET one-point method, from the viewpoint that, for example, high catalyst performance is obtained. The BET specific surface area herein refers to a value measured by use of a sample obtained by subjecting the exhaust gas-purifying three-way catalyst serving as a measuring object to aging treatment (high-temperature duration treatment). The aging treatment is here performed for the purpose of aiming at stabilization of running performance of the three-way catalyst. The aging treatment is made by performing heat treatment at 1050° C. for 12 hours with the external atmosphere being sequentially switched to A/F=12.8 and an oxygen atmosphere.

The catalyst layers L1, L2, and L3 may each include base material particles which can each support the platinum group element and/or the noble metal element (hereinafter, sometimes referred to as "other base material particle"), other than the first to third base material particles. Examples of such other base material particle include silica; alumina; stabilized composite oxides including alumina, such as silica-alumina, silica-alumina-zirconia, and silica-alumina-boria; and zeolite, but are not particularly limited thereto. Such materials can be used singly or in appropriate combinations of two or more thereof. In particular, γ-alumina having a specific surface area of 50 to 300 m$^2$/g, preferably 100 to 200 m$^2$/g is suitably used. Such other base material particle may or may not support the platinum group element and/or the noble metal element.

The content proportions of the first to third base material particles can each be appropriately set depending on the desired performance and are not particularly limited, and are preferably 50% by mass or more and 90% by mass or less, more preferably 55% by mass or more, further preferably 60% by mass or more, and more preferably 85% by mass or less, further preferably 80% by mass or less based on the total amounts of the catalyst layers L1, L2, and L3, respectively.

When the catalyst layers L1, L2, and L3 each include other base material particles, the content proportions of such other base material particles can be appropriately set depending on the desired performance and are not particularly limited, and are preferably 1% by mass or more and 45% by mass or less, more preferably 3% by mass or more, further preferably 5% by mass or more, and more preferably 40% by mass or less, further preferably 35% by mass or less based on the total amounts of the catalyst layers L1, L2, and L3, respectively.

In the exhaust gas-purifying three-way catalyst 100 of the present embodiment, the catalytically active particle of the platinum group element is supported on each of the first to third base material particles in a highly dispersed manner. The catalytically active particle supported on each of the first to third base material particles serves as a main catalytically active site. The platinum group elements contained in the catalyst layers L1, L2, and L3 correspond to palladium for the first catalyst layer L1, rhodium for the second catalyst layer L2, and platinum for the first catalyst layer L3, as essential elements, and the catalyst layers L1, L2, and L3, as long as such layers satisfy the above condition, may include noble metal elements (gold (Au), silver (Ag); and other platinum group elements (platinum (Pt), palladium (Pd), iridium (Ir), rhodium (Rh), ruthenium (Ru), osmium (Os)); other than their respective essential platinum group elements as the catalytically active particles. Such noble metal elements used in combination are preferably Pt, Pd, and Rh from the viewpoint of purification performance or the like. The catalytically active particle on each of the first to third base material particles can be changed into a simple metal or a metal oxide depending on the external environment. Thus, the catalytically active particle on each of the first to third base material particles may be confirmed at least in a reducing atmosphere, and properties of the catalytically active particle in an oxidizing atmosphere or a stoichiometric atmosphere are not particularly limited. The reducing atmosphere herein means a state where standing is conducted in a hydrogen gas atmosphere at 400° C. for 0.5 hours or more. The catalytically active particle 21 can be confirmed at a 1000000-fold magnification by use of, for example, a scanning transmission electron microscope (STEM), HD-2000 manufactured by Hitachi High-Technologies Corporation.

The content proportions of the platinum group elements can be appropriately set depending on the desired performance and are not particularly limited, and are preferably 0.1% by mass or more and 10% by mass or less, more preferably 0.5% by mass or more, further preferably 0.8% by mass or more, and more preferably 8% by mass or less, further preferably 6% by mass or less, based on the catalyst layers L1, L2, and L3, respectively, from the viewpoint of catalyst activity and the like.

The mass ratio among the platinum group elements included in the catalyst layers L1, L2, and L3, respectively, can be appropriately set depending on the desired performance and is not particularly limited. The ratio is preferably in the range of first catalyst layer:third catalyst layer=1:1 to 4, more preferably first catalyst layer:third catalyst layer=1: 1.5 to 4, from the viewpoint that, for example, not only the amounts of the platinum group elements used are kept small, but also catalyst performance of the entire catalyst layer 21 is kept high even if the third catalyst layer L3 serving as an outermost layer is poisoned by catalyst poison.

The mass ratio between palladium and rhodium included in the catalyst layers L1, L2, and L3 can be appropriately set depending on the desired performance and is not particularly limited, and is preferably in the range of Pd:Rh=4 to 20:1 in total, more preferably in the range of Pd:Rh=5 to 15:1 in total.

The average particle sizes of the catalytically active particles on the first to third base material particles may be appropriately set depending on the desired performance in consideration of the materials and pore sizes of the first to third base material particles, respectively, and is not particularly limited. The average particle size of the catalytically active particle is preferably 30 nm or more, preferably 35 nm or more, preferably 40 nm or more, and preferably 300 μm or less, more preferably 270 μm or less, further preferably 250 μm or less from the viewpoint of, for example, not only a more enhancement in catalyst activity, but also suppression of sintering and particle growth. Such a catalytically active particle having the above fine particle size is present on the surface of each of the first to third base material particles, thereby resulting in a tendency where a larger surface area is easily maintained and more catalytically active sites are easily maintained. The presence of the catalytically active particle on the base material particle can be found according to any of various measurement procedures such as observation with a scanning transmission electron microscope (STEM), powder X-ray diffraction (XRD: X-ray Diffraction, electron probe micro analyzer (EPMA), or an X-ray photoelectron spectroscopy (XPS, or ESCA: Electron Spectroscopy for Chemical Analysis).

Any of commercially available products of various grades can be used in each of the first to third base material particles. For example, a base material particle having the above composition can also be produced according to any method known in the art. Such a production method is not particularly limited, and a co-precipitation method and an alkoxide method are preferable.

The co-precipitation method is preferably, for example, a production method including adding an alkali substance to an aqueous solution obtained by mixing a cerium salt and/or a zirconium salt, and other rare-earth metal element or a transition element, if necessary blended, at a predetermined stoichiometric ratio, resulting in hydrolysis or co-precipitating of a precursor, and firing the hydrolyzed product or co-precipitated product. The types of various salts here used are not particularly limited. In general, hydrochloride, oxyhydrochloride, nitrate, oxynitrate, carbonate, phosphate, acetate, oxalate, citrate, and the like are preferable. The type of the alkali substance is also not particularly limited. In general, an aqueous ammonia solution is preferable. The alkoxide method is preferably, for example, a production method including hydrolyzing a mixture obtained by mixing cerium alkoxide and/or zirconium alkoxide, and other rare-earth metal element or a transition element, if necessary blended, at a predetermined stoichiometric ratio, and thereafter firing the resultant. The type of the alkoxide here used is not particularly limited. In general, methoxide, ethoxide, propoxide, isopropoxide, butoxide, an ethylene oxide adduct thereof, and the like are preferable. The rare-earth metal element may be blended as a metal alkoxide or any of various salts described above.

The firing conditions may be according to an ordinary method and is not particularly limited. The firing atmosphere may be any atmosphere of an oxidizing atmosphere, a reducing atmosphere, and an air atmosphere. The firing temperature and the treatment time are varied depending on the desired composition and the stoichiometric ratio, and are generally preferably 150° C. or more and 1300° C. or less and 1 to 12 hours, more preferably 350° C. or more and 800° C. or less and 2 to 4 hours, respectively, from the viewpoint of productivity and the like. It is here preferable to perform drying under reduced pressure by use of a vacuum dryer or the like and drying treatment at 50° C. or more and 200° C. or less for about 1 to 48 hours, prior to firing at a high temperature.

The catalyst layers L1, L2, and L3 may each contain any binders known in the art, in addition to the above first to third base material particles, respectively, other base material particles, platinum group elements, and noble metal elements. The types of the binders are not particularly limited, and examples include various sols such as boehmite, alumina sol, titania sol, silica sol, and zirconia sol. A soluble salt such as aluminum nitrate, aluminum acetate, titanium nitrate, titanium acetate, zirconium nitrate, or zirconium acetate can also be used as each of the binders. Any other acid such as acetic acid, nitric acid, hydrochloric acid, or sulfuric acid can also be used as each of the binders. The total amounts of the binders used are not particularly limited, and are preferably 0.01 to 15% by mass, more preferably 0.05 to 10% by mass, further preferably 0.1 to 8% by mass, based on the total amounts of the catalyst layers L1, L2, and L3, respectively.

The catalyst layers L1, L2, and L3 may each further contain Ba-containing compounds. Such Ba-containing compounds can each be blended to thereby allow an enhancement in heat resistance and activation of catalyst performance to be expected. Examples of such a Ba-containing compound include sulfate, carbonate, a composite oxide, and an oxide, but are not particularly limited thereto. More specific examples include BaO, Ba $(CH_3COO)_2$, $BaO_2$, $BaSO_4$, $BaCO_3$, $BaZrO_3$, and $BaAl_2O_4$, and in particular, $BaSO_4$ is preferable. The total amounts of the Ba-containing compounds used are not particularly limited, and are preferably 1 to 20% by mass, more preferably 3 to 15% by mass, further preferably 5 to 13% by mass, based on the total amounts of the catalyst layers L1, L2, and L3, respectively.

The catalyst layers L1, L2, and L3 may each contain a catalyst, a catalyst aid, and various additives known in the art, in addition to the above components. Examples of such various additives include dispersion stabilizers such as a nonionic surfactant and an anionic surfactant; pH adjusters; and viscosity modifiers, but are not particularly limited thereto.

The exhaust gas-purifying three-way catalyst 100 of the present embodiment, in which not only the catalyst layer 21 having the layered structure is adopted, but also the total coating weight Wt in the catalyst layers L1, L2, and L3 (provided that the platinum group element included in each of the catalyst layers L1, L2, and L3 is excluded) per volume of the catalyst carrier 11 is 110 g/L or more and 225 g/L or less in total, thus not only is small in the amount of the platinum group element used and can be early increased in temperature to a catalytically active temperature, but also is significantly suppressed in degradation in performance due to a catalyst poison included in an exhaust gas and can exhibit excellent catalyst performance. The reason for this is described below.

First, as the total coating weight Wt in the catalyst layers L1, L2, and L3 is smaller, feeling of an exhaust gas at a high temperature tends to allow the temperature to be early increased to a catalytically active temperature. In other words, as the total coating weight Wt in the catalyst layers L1, L2, and L3 is increased, warming performance tends to be deteriorated. On the other hand, as the total coating weight Wt in the catalyst layers L1, L2, and L3 is larger, deterioration in performance due to catalyst poison tends to be less caused, resulting in an increase in catalyst performance.

As described above, warming performance and resistance to catalyst poison are in a tradeoff relationship with the total coating weight Wt in the catalyst layers L1, L2, and L3. It, however, has been found according to findings of the present inventors that a poisoning phenomenon by catalyst poison is decreased depending on the thickness of the catalyst layer 21 (the total coating weight Wt in the catalyst layers L1, L2, and L3) and catalyst poison does not sufficiently penetrate or diffuse when a certain depth is reached from the outermost surface of the catalyst layer 21. That is, it has been found that, when the catalyst layer 21 has a layered configuration of the catalyst layers L1 to L3 and has a total coating weight Wt of 110 g/L or more and 225 g/L or less in total, catalyst poison does not sufficiently penetrate or diffuse to the first catalyst layer L1 (closer to the catalyst carrier 11) and the first catalyst layer L1 can contain a first composite catalyst particle with palladium supported, thereby allowing the above tradeoff relationship to be broken away and allowing warming performance and resistance to catalyst poison to be simultaneously satisfied. That is, such a configuration enables an exhaust gas-purifying three-way catalyst not only relatively light in weight, but also excellent in resistance to catalyst poison to be realized, and as a result, enables the amount of the platinum group element used to be relatively small and enables the temperature rise to be early increased to a catalytically active temperature.

The total coating weight Wt in the catalyst layers L1, L2, and L3 (provided that the platinum group element included in each of the catalyst layers L1, L2, and L3 is excluded) is preferably 125 g/L or more and 200 g/L or less in total, more preferably 130 g/L or more and 170 g/L or less in total, per volume of the catalyst carrier 11, from the viewpoint of catalyst performance.

The catalyst layers L1, L2, and L3 preferably include 1 g/L or more and 10 g/L or less, more preferably 1.7 g/L or more and 9.0 g/L or less, further preferably 2.5 g/L or more and 5.0 g/L or less in total of the platinum group elements, per volume of the catalyst carrier 11.

The coating weight $W_1$ in the first catalyst layer L1 (provided that the platinum group element included in first catalyst layer L1 is excluded) relative to the total coating weight Wt in the catalyst layers L1, L2, and L3 (provided that the platinum group element included in each of the catalyst layers L1, L2, and L3 is excluded) preferably satisfies the relationship of $0.1\ Wt \leq W_1 \leq 0.4\ Wt$, more preferably satisfies the relationship of $0.2\ Wt \leq W_1 \leq 0.4\ Wt$, further preferably satisfies the relationship of $0.3\ Wt \leq W_1 \leq 0.4\ Wt$ from the viewpoint that the first catalyst layer L1 (closer to the catalyst carrier 11) in a region where catalyst poison does not sufficiently penetrate or diffuse is sufficiently ensured and both warming performance and resistance to catalyst poison are kept high.

The exhaust gas-purifying three-way catalyst 100 having the above layer configuration can be produced by, for example, providing each of the catalyst layers L1, L2, and L3 on the catalyst carrier 11 such as any ceramic monolith carrier described above. The exhaust gas-purifying three-way catalyst 100 of the present embodiment can be obtained by, for example, sequentially covering the surface of the catalyst carrier 11 with a slurry-like mixture for each of the catalyst layers L1, L2, and L3 (supporting). The method for applying the slurry-like mixture to the catalyst carrier 11 may be performed according to an ordinary method and is not particularly limited. Any of various known coating methods, wash-coating methods, and zone-coating methods can be applied. After the slurry-like mixture is applied, the resultant can be dried or fired according to an ordinary method.

In a specific example, the first catalyst layer L1 can be provided on the catalyst carrier 11 by, for example, mixing the above first composite catalyst particle, an aqueous medium, and, if necessary, the above binder and Ba-containing compound, other base material particle, other catalyst, a catalyst aid, an OSC material, various additives, and the like at any desired blending ratio to prepare a slurry-like mixture for the first catalyst layer L1, applying the resulting slurry-like mixture for the first catalyst layer L1 to the surface of the catalyst carrier 11 such as a honeycomb structure carrier, and drying and firing the resultant. Next, the first catalyst layer L1 and the second catalyst layer L2 can be provided on the catalyst carrier 11, by preparing a slurry-like mixture for the second catalyst layer L2, again applying the mixture to the first catalyst layer L1, and drying and firing the resultant. The same is true on the third catalyst layer.

The method for preparing each of the first to third composite catalyst particles is not particularly limited as long as a composite particle is obtained where the catalytically active particle of the platinum group element is supported on the base material particle, and an evaporation drying method (impregnation method) or the like is preferable from the viewpoints of reproducibility and production at a low cost. A preferable evaporation drying method is preferably a production method including impregnating the base material particle with an aqueous solution containing at least a platinum group element ion, and thereafter performing heat treatment or chemical treatment. The impregnation treatment allows the platinum group element ion to adhere (be attached) to the surface of the base material particle in a highly dispersed state. The platinum group element ion can be here blended in the aqueous solution, as any of various salts of the platinum group element. The type of such any of various salts here used is not particularly limited. In general, sulfate, hydrochloride, oxyhydrochloride, nitrate, oxynitrate, carbonate, oxycarbonate, phosphate, acetate, oxalate, citrate, chloride, oxide, a composite oxide, a complex salt, and the like are preferable. The content proportion of the platinum group element ion in the aqueous solution can be appropriately adjusted so that a desired content proportion of the catalytically active particle of each of the platinum group elements in the resulting exhaust gas-purifying three-way catalyst 100 is achieved, and is not particularly limited. Needless to say, the aqueous solution here used may include any optional component described above, for example, not only other rare-earth element and a transition element, but also inevitable impurities.

After the impregnation treatment, solid-liquid separation treatment, water-washing treatment, drying treatment for removal of moisture, for example, in the air at a temperature of about 50° C. or more and 200° C. or less for about 1 to 48 hours, and/or the like can be, if necessary, performed according to ordinary method(s). The drying treatment may be natural drying, or may be made by use of a drying apparatus such as a drum type dryer, a reduced pressure dryer, or spray drying. The atmosphere in the drying treatment may be any of an air atmosphere, a vacuum atmosphere, and any atmosphere of an inert gas such as a nitrogen gas. Herein, grinding treatment, classification treatment, or the like may be, if necessary, further performed before and after such drying. Alternatively, chemical treatment may also be performed, and, for example, the platinum group element ion may be subjected to hydrolysis on the surface of the base material particle by use of a basic component, after the impregnation treatment in the evaporation drying method. A preferable basic component here used is ammonia, an amine such as ethanolamine, an alkali metal hydroxide such as caustic soda or strontium hydroxide, or an alkali earth metal hydroxide such as barium hydroxide. Such heat treatment or chemical treatment allows for production of a catalytically active particle of each of the platinum group elements in a highly dispersed manner in the order of nanometers, on the surface of the base material particle.

The firing conditions may be according to an ordinary method and are not particularly limited. A heating unit is not particularly limited, and, for example, any known equipment such as an electric furnace or a gas furnace can be used. The firing atmosphere may be any of an oxidizing atmosphere, an air atmosphere, and a reducing atmosphere, and an oxidizing atmosphere and an air atmosphere are preferable. The firing temperature and the treatment time are varied depending on the desired performance, and are generally preferably 500° C. or more and 1100° C. or less and 0.1 to 12 hours, more preferably 550° C. or more and 800° C. or less and 0.5 to 6 hours, respectively, from the viewpoint of production, productivity and the like of the catalytically active particle of each of the platinum group elements.

The noble metal elements and/or the platinum group elements may be, if necessary, further supported on the first to third composite catalyst particles or other base material particles obtained as above. Any known procedure can be applied to the method for supporting such a noble metal element and/or such a platinum group element, and is not particularly limited. Such a noble metal element and/or such a platinum group element can be supported by, for example, preparing a salt solution including such a noble metal element and/or such a platinum group element, impregnating such a salt-containing solution with each of the first to third composite catalyst particles, and, if necessary, performing drying treatment and then firing. The salt-containing solution is not particularly limited, and an aqueous nitrate solution, a dinitrodiammine nitrate solution, an aqueous chloride solution, and the like are preferable. The firing treatment is not particularly limited, and is preferably made at 500° C. or more and 1100° C. or less for 0.1 to 12 hours, more preferably at 550° C. or more and 800° C. or less for 0.5 to 6 hours. The firing treatment is preferably made at 350° C. or more and 1000° C. or less for about 1 to 12 hours.

The aqueous medium for use in preparation of the slurry-like mixture may be used in an amount so that each component can be uniformly dispersed or dissolved in the slurry. Herein, if necessary, an acid or a base for pH adjustment can be blended, or a surfactant or a dispersing resin, for viscosity adjustment or an enhancement in dispersibility of the slurry, or the like, can be blended. Such any binder described above is preferably used from the viewpoint that each of the first to third composite catalyst particles is strongly attached or bound. Any known grinding method or mixing method, for example, grinding and mixing by a ball mill can be applied as the method for mixing the slurry.

After the slurry-like mixture is applied to the catalyst carrier 11, drying and/or firing can be performed according to an ordinary method. The drying temperature is not particularly limited and is, for example, preferably 70 to 200° C., more preferably 80 to 150° C. The firing temperature is not particularly limited and is, for example, preferably 300 to 650° C., more preferably 400 to 600° C. The heating unit here used can be any known heating unit such as an electric furnace or a gas furnace.

The exhaust gas-purifying three-way catalyst 100 of the present embodiment can be, for example, used as a catalyst for purifying an exhaust gas of an diesel engine, a gasoline engine, a jet engine, a boiler, a gas turbine, and the like, and is useful as an exhaust gas-purifying catalyst for an internal-combustion engine, in particular, an exhaust gas-purifying three-way catalyst for an automobile. The exhaust gas-purifying three-way catalyst 100 of the present embodiment can be disposed in any exhaust system of various engines. The number and the locations of such catalysts disposed can be appropriately designed depending on the exhaust gas regulation. For example, when the exhaust gas regulation is critical, such catalysts can be placed at two or more locations and can be disposed under floor behind a directly-under-catalyst in an exhaust system. The exhaust gas-purifying three-way catalyst 100 of the present embodiment can then exert an excellent effect on a purification reaction of CO, HC, and NOx not only at the start-up at a low temperature, but also in various running specifications including high-speed running at a high temperature.

EXAMPLES

The features of the present invention are described below in more detail with reference to Test Examples, Examples and Comparative Examples, but the present invention is not intended to be limited by such Examples at all. That is, the materials, the amounts of use, the rates, the treatment contents, the treatment procedures, and the like represented in the following Examples can be appropriately modified without departing from the gist of the present invention. Various production conditions and evaluation result values in the following Examples each mean a preferable upper limit or a preferable lower limit in embodiments of the present invention, and preferable ranges thereof may each be any range prescribed as a combination of the value of the upper limit or the lower limit and any value in the following Examples or any values in such Examples.

Example 1

Thirty three parts by mass of a γ-alumina powder (BET specific surface area: 150 m$^2$/g; average particle size $D_{50}$=10 μm) and 67 parts by mass of a ceria-zirconia-based composite oxide forming a solid solution with Nd and Pr (designated as CeZrNdPr oxide 1, $Nd_2O_3$: 7% by mass, $Pr_5O_{11}$: 7% by mass, $CeO_2$: 40% by mass, $ZrO_2$: 45% by mass, average particle size $D_{50}$=10 μm) were impregnated with a solution of palladium (II) nitrate (which was contained at a rate of 20% by mass in terms of Pd), and fired at 600° C. for 30 minutes, thereby obtaining a first composite catalyst particle.

A slurry-like mixture was prepared by mixing 89 parts by mass of the resulting first composite catalyst particle, 10 parts by mass of $BaSO_4$, and 1 part by mass of boehmite, and diluting the mixture with pure water. A honeycomb carrier made of cordierite was coated with the resulting slurry-like mixture in a coating weight of 50.5 g/L according to a wash-coating method, and dried, thereby producing a first catalyst layer L1 (Pd coating weight: 1.2 g/L).

A second base material particle used here was a ceria-zirconia-based composite oxide forming a solid solution with Nd and Pr (designated as CeZrNdPr oxide 2, $Nd_2O_3$: 7% by mass, $Pr_5O_{11}$: 7% by mass, $CeO_2$: 28% by mass, $ZrO_2$: 58% by mass, $D_{50}$=10 μm). Next, a solution of rhodium (III) nitrate (which was contained at a rate of 10% by mass in terms of Rh) was prepared, a base material particle of CeZrNdPr oxide 2 described above was impregnated with the solution of rhodium (III) nitrate, and the resultant was fired at 600° C. for 30 minutes, thereby obtaining a second composite catalyst particle.

A slurry-like mixture was prepared by mixing 66 parts by mass of the resulting second composite catalyst particle, 33 parts by mass of the γ-alumina powder (BET specific surface area: 150 m$^2$/g; average particle size $D_{50}$=10 μm), and 1 part by mass of boehmite, and diluting the mixture with pure water. The first catalyst layer L1 on the honeycomb carrier made of cordierite was coated with the resulting slurry-like mixture in a coating weight of 48.5 g/L according to a wash-coating method, and dried, thereby producing a second catalyst layer L2 (Rh coating weight: 0.5 g/L).

Thirty three parts by mass of a γ-alumina powder (BET specific surface area: 150 m$^2$/g; average particle size $D_{50}$=10 μm) and 67 parts by mass of CeZrNdPr oxide 2 described above were impregnated with a solution of palladium (II) nitrate (which was contained at a rate of 20% by mass in terms of Pd), and fired at 600° C. for 30 minutes, thereby obtaining a third composite catalyst particle.

A slurry-like mixture was prepared by mixing 89 parts by mass of the resulting third composite catalyst particle, 10 parts by mass of $BaSO_4$, and 1 part by mass of boehmite, and diluting the mixture with pure water. The second catalyst layer L2 on the honeycomb carrier made of cordierite was coated with the resulting slurry-like mixture in a coating weight of 50.5 g/L according to a wash-coating method, and dried, thereby producing a third catalyst layer L3 (Pd coating weight: 1.9 g/L).

Thus, an integral structure type layered catalyst having a layer configuration illustrated in FIG. 1 was obtained where the first catalyst layer L1, the second catalyst layer L2, and the third catalyst layer L3 were provided on the honeycomb carrier made of cordierite, in the listed order. Next, the resulting integral structure type layered catalyst was stored into a converter one by one, and thereafter the converter was mounted downstream of an exhaust port of a gasoline engine. Thereafter, a cycle of steady-state, deceleration, and acceleration was repeated for 36 hours. The temperature was set so as to be 950° C. at the steady-state, and thermal duration treatment was performed. After such thermal treatment, poisoning treatment was performed. The poisoning treatment was made by mixing oil containing a trace of P, with gasoline, and repeating the cycle of steady-state, deceleration, and acceleration for 50 hours. The temperature was set so as to be 700° C. at the steady-state, and an exhaust gas-purifying three-way catalyst of Example 1, subjected to the thermal treatment and the poisoning treatment, was obtained. The total amount of passing of P in the thermal treatment and the poisoning treatment was about 10 g in terms of $P_2O_5$.

Examples 2 to 4 and Comparative Examples 1 to 4

Figure 2:
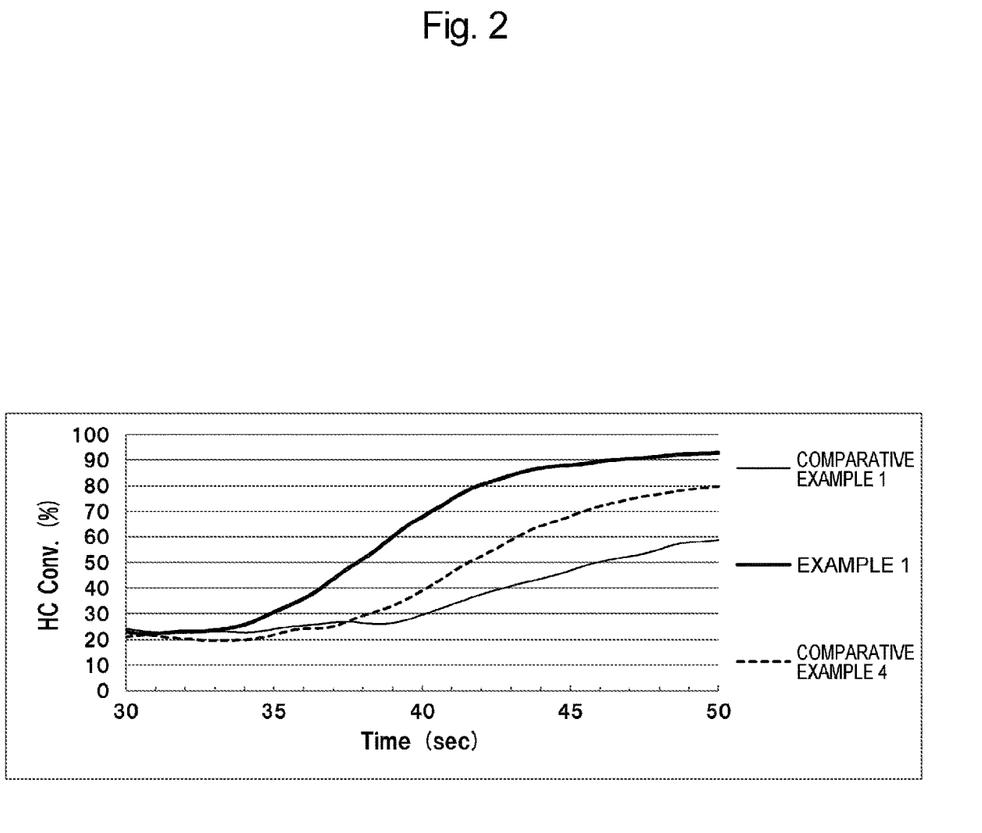
FIG. 2 is a graph representing the HC conversion efficiency of each exhaust gas-purifying three-way catalyst of Example 1 and Comparative Examples 1 and 4.
Figure 3:
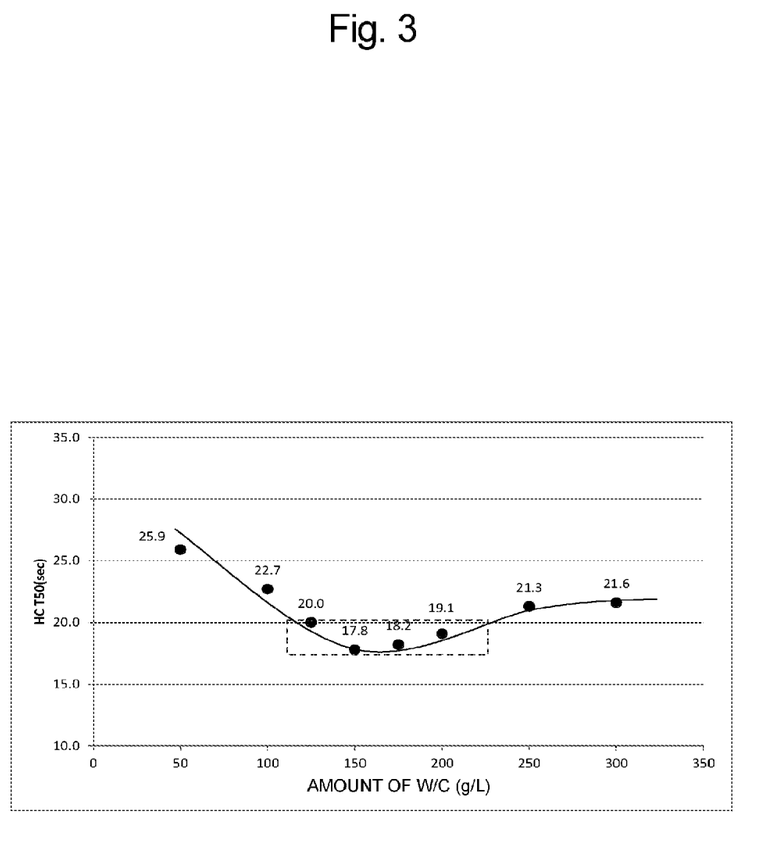
FIG. 3 is a graph representing a relationship between HCT50 and the coating weight Wt in a catalyst layer in an exhaust gas-purifying three-way catalyst of Examples 1 to 4 and Comparative Examples 1 to 4.

Each exhaust gas-purifying three-way catalyst after duration treatment, of Examples 2 to 4 and Comparative Examples 1 to 4, was obtained in the same manner as in Example 1 except that the content (coating weight) of each of the platinum group elements was not changed and the coating weight of each base material particle was changed as shown in Table 1.

cantly excellent in HC conversion efficiency as compared with the exhaust gas-purifying three-way catalysts of Comparative Examples 1 and 4. As illustrated in FIG. 3, it was confirmed that the exhaust gas-purifying three-way catalysts of Examples 1 to 4, where the total coating weight Wt was in the range from 110 to 225 g/L, was locally small in HCT50 as compared with the exhaust gas-purifying three-way catalysts of Comparative Examples 1 to 4, where the total coating weight Wt was not in the range.

INDUSTRIAL APPLICABILITY

The exhaust gas-purifying three-way catalyst of the present invention can be widely and effectively utilized as a three-way catalyst for decreasing NOx, CO, HC, and the like in an exhaust gas, and can be particularly effectively utilized in, for example, a catalyst application for purification of any exhaust gas in a diesel engine, a gasoline engine, a jet engine, a boiler, a gas turbine, and the like. The exhaust gas-purifying three-way catalyst of the present invention can also be effectively utilized as TWC for a directly-under-engine type catalytic converter, a tandem-arranged directly-under type catalytic converter, and the like.

REFERENCE SIGNS LIST

100: exhaust gas-purifying three-way catalyst
11: catalyst carrier
11a: surface
11b: surface

TABLE 1

| | Coating weight of platinum group element | Total coating weight in catalyst layer Wt | Coating weight in first catalyst layer $W_1$ | Coating weight in second catalyst layer $W_2$ | Coating weight in third catalyst layer $W_3$ |
|---|---|---|---|---|---|
| Comparative Example 1 | 3.60 (g/L) | 50 (g/L) | 16.8 (g/L) | 16.2 (g/L) | 16.8 (g/L) |
| Comparative Example 2 | 3.60 (g/L) | 100 (g/L) | 33.7 (g/L) | 32.3 (g/L) | 33.7 (g/L) |
| Example 2 | 3.60 (g/L) | 125 (g/L) | 42.1 (g/L) | 40.4 (g/L) | 42.1 (g/L) |
| Example 1 | 3.60 (g/L) | 150 (g/L) | 50.5 (g/L) | 48.5 (g/L) | 50.5 (g/L) |
| Example 3 | 3.60 (g/L) | 175 (g/L) | 58.9 (g/L) | 56.6 (g/L) | 58.9 (g/L) |
| Example 4 | 3.60 (g/L) | 200 (g/L) | 67.3 (g/L) | 64.7 (g/L) | 67.3 (g/L) |
| Comparative Example 3 | 3.60 (g/L) | 250 (g/L) | 84.2 (g/L) | 80.8 (g/L) | 84.2 (g/L) |
| Comparative Example 4 | 3.60 (g/L) | 300 (g/L) | 101.0 (g/L) | 97.0 (g/L) | 101.0 (g/L) |

[Laboratory Measurement of Exhaust Gas Conversion Efficiency]

Each of the exhaust gas-purifying three-way catalysts after duration treatment was used and the light-off test of the HC conversion efficiency was performed. A 2-L engine was here used, and a temperature sensor was attached at a location of 1 inch from the end of a catalyst inlet, an exhaust gas kept at 450° C. by bypass switching was introduced and measurement was made in the course of temperature rise from an initiation temperature of 30° C., in conditions of a speed of rotation of the engine of 1950 rpm, a boost pressure of −280 mmHg and a rate of A/F of 14.56±0.1/2.5 Hz. The measurement results of the HC conversion efficiency are illustrated in FIG. 2. A relationship between HCT50 (time taken until the HC conversion efficiency reached 50%) and the coating weight Wt in the catalyst layer is illustrated in FIG. 3.

As illustrated in FIG. 2, it was confirmed that the exhaust gas-purifying three-way catalyst of Example 1 was signifi- 21: catalyst layer
L1: first catalyst layer
L2: second catalyst layer
L3: third catalyst layer

The invention claimed is:

1. An exhaust gas-purifying three-way catalyst comprising at least a catalyst carrier and a catalyst layer provided on at least one surface of the catalyst carrier,
    wherein:
    the catalyst layer has a layered structure comprising at least a first catalyst layer comprising a platinum group element, a second catalyst layer comprising a platinum group element, and a third catalyst layer as an outermost layer, comprising a platinum group element, in the listed order,
    the first catalyst layer comprises at least a first base material particle and a first composite catalyst particle comprising palladium at least supported on the first base material particle, the second catalyst layer comprises at least a second base material particle and a second composite catalyst particle comprising rhodium at least supported on the second base material particle, the third catalyst layer comprises at least a third base material particle and a third composite catalyst particle comprising palladium at least supported on the third base material particle, and a total coating weight Wt of the first to third catalyst layers, provided that the platinum group element of each of the catalyst layers is excluded, per volume of the catalyst carrier is 110 g/L or more and 225 g/L or less in total, wherein the first base material particle, the second base material particle, and the third base material particle each independently comprises an oxygen storage material comprising a ceria/zirconia-based composite oxide doped with at least one rare-earth element selected from the group consisting of scandium, yttrium, lanthanum, praseodymium, neodymium, promethium, samarium, europium, gadolinium, terbium, dysprosium, holmium, erbium, thulium, ytterbium, and lutetium, wherein the ceria/zirconia-based composite oxide comprises, as constituent metal elements, Nd and Pr at the following mass proportions in terms of oxide and relative to a total mass of the ceria/zirconia-based composite oxide:

$CeO_2$ 10 to 50% by mass;

$ZrO_2$ 40 to 80% by mass;

$Nd_2O_3$ 0.1 to 10% by mass; and $Pr_5O_{11}$ 0.1 to 10% by mass.

2. The exhaust gas-purifying three-way catalyst of claim 1, wherein a coating weight $W_1$ of the first catalyst layer, provided that the platinum group element of the first catalyst layer is excluded, relative to the total coating weight Wt satisfies the following relationship:

$$0.1\ Wt \leq W_1 \leq 0.4 Wt.$$

3. The exhaust gas-purifying three-way catalyst of claim 1, wherein the total coating weight Wt is 125 g/L or more and 200 g/L or less in total, per volume of the catalyst carrier.

4. The exhaust gas-purifying three-way catalyst of claim 1, wherein the catalyst layer comprises 1 g/L or more and 10 g/L or less of the platinum group elements in total, per volume of the catalyst carrier.

5. The exhaust gas-purifying three-way catalyst of claim 1, wherein a Ce content proportion of the ceria/zirconia-based composite oxide of the first base material particle is greater than a Ce content proportion of the ceria/zirconia-based composite oxide of the third base material particle, in terms of $CeO_2$.

6. The exhaust gas-purifying three-way catalyst of claim 1, wherein the first catalyst layer and the third catalyst layer each further comprises a composite catalyst particle comprising alumina having a specific surface area of 50 to 300 $m^2/g$ and palladium at least supported on the alumina.

7. The exhaust gas-purifying three-way catalyst of claim 1, wherein the second catalyst layer further comprises alumina having a specific surface area of 50 to 300 $m^2/g$.

8. The exhaust gas-purifying three-way catalyst of claim 1, wherein the first catalyst layer and the third catalyst layer each further comprises a Ba-containing compound.

9. The exhaust gas-purifying three-way catalyst of claim 1, wherein a mass ratio of the respective platinum group elements of the first catalyst layer to the third catalyst layer is in the range of 1:1 to 4.

10. The exhaust gas-purifying three-way catalyst of claim 1, wherein a mass ratio of the total palladium content of the first catalyst layer, the second catalyst layer, and the third catalyst layer to the total rhodium content of the first catalyst layer, the second catalyst layer, and the third catalyst layer is in the range of 4 to 20:1.

\* \* \* \* \*